June 11, 1935. H. JUNKERS ET AL 2,004,662
MEANS FOR MEASURING THE DISTANCE OF AN AIRCRAFT FROM GROUND
Filed Feb. 7, 1931

Inventors:
Hugo Junkers
and Heinrich Wigge
by Karl Michaelis
Atty.

Patented June 11, 1935

2,004,662

UNITED STATES PATENT OFFICE 2,004,662

MEANS FOR MEASURING THE DISTANCE OF AN AIRCRAFT FROM GROUND

Hugo Junkers, Dessau, and Heinrich Wigge, Koethen, Germany

Application February 7, 1931, Serial No. 514,216
In Germany February 12, 1930

3 Claims. (Cl. 177—352)

Our invention relates to means for measuring the distance of an aircraft from ground.

It is well known in the art that the capacity of a suitably arranged condenser is varied when it approaches the ground. If the condenser is connected with a self-excited oscillator, the variations of the capacity produce a detuning of the latter which may be used for indicating the approaching of the ground, quite particularly shortly before the aircraft lands. The detuning of the oscillator may be observed by observing the beat oscillations produced by the oscillator in combination with another oscillator having a constant natural frequency independent of the distance from ground. The beat oscillations may be made perceivable by means of an indicator well known in the art, for instance a telephone or an oscillograph.

It is an object of our invention to tune the oscillators to resonance for a predetermined distance from ground. This may be done by means of tuning means such as for instance a tuning condenser or variometer inserted in the oscillator whose frequency is independent of the distance from ground. If the beat oscillations are observed by means of a telephone, the beat frequencies will be extinguished within a certain range above and below the resonance distance from ground so that the pilot is advised that the aircraft is in predetermined altitude range.

We have further found it advantageous to couple the oscillators with each other. We have ascertained that the beat note in the telephone, before disappearing below the audibility limit, is extinguished and reestablished with a cracking sound, if the oscillators are coupled, and that the widths of the range in which the beat note is extinguished may be adjusted by suitably tuning and coupling the oscillators. Therefore two predetermined altitudes may be signaled to the pilot by the cracking extinction and reestablishment of the beat note. The pilot is not required to observe a gradual extinguishing and reestablishing of the beat note. Preferably the coupling and tuning of the oscillators are adjusted in such manner that the extinction and reestablishment of the beat note indicate the altitude at which certain landing operations must be carried out by the pilot.

Figure 1:
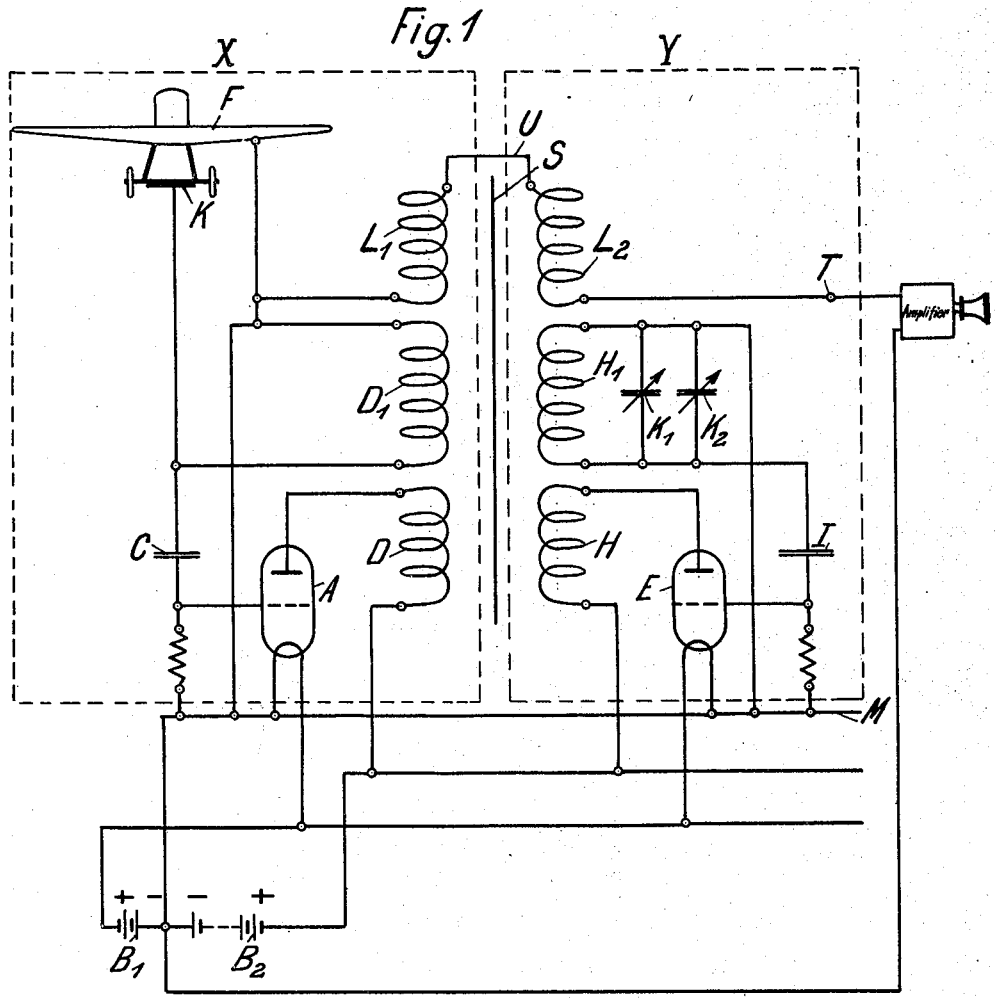

In the drawing affixed to this specification and forming part thereof a device embodying our invention is illustrated diagrammatically by way of example in Fig. 1.

Figure 2:
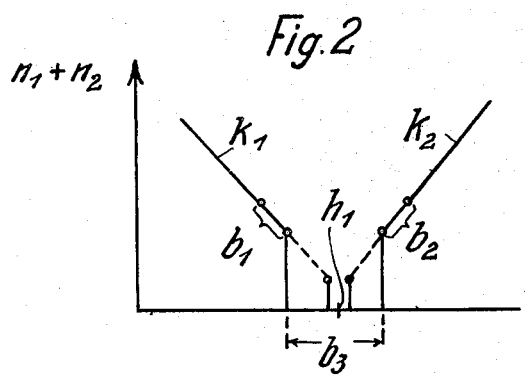

Fig. 2 is a diagram explaining the operation of the device shown in Fig. 1.

In Fig. 1 of the drawing X is the oscillator, the natural frequency of which is dependent upon the distance from ground, and Y is the oscillator having a natural frequency independent of altitude. The oscillator X comprises a condenser which is formed by the airplane body F and an auxiliary condenser surface K. The capacity of this condenser depends upon the distance from ground. The oscillator X further comprises an electron tube A, a condenser C and coils D, $D^1$ and $L^1$. The oscillator Y having a natural frequency independent from the distance from ground comprises an electron tube E, coils H, $H^1$ and $L^2$, and adjustable condensers $K^1$, $K^2$, which are designed for coarse and fine adjustment respectively. I is a condenser of constant capacity. Coils D and H are connected in the plate circuits of tubes A and E, respectively. Coils $D^1$ and $H^1$ shunted by the variable capacity formed by the airplane body F and the condenser surface K and the adjustable condensers $K^1$, $K^2$, respectively, are connected in the grid circuits of the tubes A and E in series with condensers C and I, respectively. Coil $D^1$ is coupled with coil D and coil $H^1$ with coil H in a similar manner so that oscillations are self-excited by back coupling in the circuits H and Y, respectively. Coils $L^1$ and $L^2$ being connected in series are coupled with coils $D^1$ and $H^1$, respectively. The couplings referred to are adjustable for the purpose explained hereinafter. $B^1$ and $B^2$ are the heating battery and the anode battery for the electron tubes A and E. S is a screen arranged between the oscillators X and Y. M is a conductor by which the negative terminals of the heating batteries $B^1$ and $B^2$ are connected to the heating filaments of tubes A and E and to the grids of the tubes in a well known manner. U is a connection connecting the outer terminals of the coils $L^1$ and $L^2$. The other terminal of coil $L^1$ is connected to the airplane body F and the other terminal of coil $L^2$ is connected to the terminal T connected to the grid of an amplifier tube (not shown), by which the beat oscillations are amplified and fed to a telephone (not shown).

The operation of the device is as follows:

In both self-exciting oscillators X and Y oscillations are produced. The natural frequency of the oscillations produced by oscillator Y depends upon the adjustment of the condensers $K^1$, $K^2$ and is independent of the distance of the airplane from ground. The natural frequency of the oscillations of oscillator X depends upon the distance from ground since the capacity of the condenser formed by the airplane body F and the auxiliary condenser surface K depends from the altitude. The oscillations produced in the oscillators X, Y are superposed by means of the coils $L^1$, $L^2$ connected with each other and the coupling M of the oscillators. The beat oscillations are fed to the terminal T and then amplified and reproduced by means of an amplifier and a telephone (not shown). In such altitudes in which approximate resonance between the oscillators occurs, the beat oscillations will be extinguished. Due to the coupling of the oscillators the beat oscillations will be extinguished within a predetermined range which can be adjusted by suitably designing the tuning and coupling means. The extinction and reestablishment of the beat note takes place with a cracking sound. Reference is had to Fig. 2 showing a diagram in which the abscissæ are formed by the values of the detuning $h$ of an oscillating circuit, the resonant frequency of which varies in dependency upon the distance from ground, while the ordinates are the beat frequencies $n_1 \pm n_2$ of the oscillating circuits coupled with each other. The beat frequency is observed as a signal by means of the coupling circuit comprising the coil $L_1$ and $L_2$ and an indicator, for instance a telephone.

If the oscillating circuits were closely coupled with each other, beat frequencies would be observed within the ranges represented by the curves $k_1$ and $k_2$ shown in full lines. In the telephone the signal would be observed merely within the narrow ranges $b_1$ and $b_2$ corresponding to relatively short periods of time. In the intermediate interval $b_3$ no signal would be observed in the telephone and in consequence thereof the device could not be used to determine the exact distance from ground, since this distance $h_1$ would coincide with the mid-point of the relatively large interval $b_3$. The length of the interval $b_3$ would not be appreciably altered by directly and magnetically coupling the oscillating circuits with the control circuit.

If according to our invention the oscillating circuits are coupled with each other not closely and magnetically, but loosely by means of the coupling circuit, close coupling being prevented by the screen S, the interval $b_3$ comprising the distance $h_1$ in which no signal is observed in the telephone, is considerably shortened. In this case the curves $k_1$ and $k_2$ are prolonged by the extensions shown in dotted lines in Fig. 2, and the ranges $b_1$ and $b_2$ in which a signal is observed in the telephone are extended correspondingly. In consequence thereof the signal is suddenly extinguished at considerably lower frequencies than in the case discussed above and the distance $h_1$ can be observed with great accuracy.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. A device for measuring the distance of an aircraft from ground comprising two self-excited oscillating circuits arranged so as to produce a beat note, means for automatically varying the resonant frequency of one of said circuits in accordance with the distance of the aircraft from ground, means for maintaining the resonant frequency of the other circuit at a value independent of the distance of the aircraft from ground, said oscillating circuits being so tuned and coupled that the beat note disappears at a predetermined altitude at which the aviator performs an act in landing, and an acoustical indicating device operatively connected with said oscillating circuits.

2. A device for measuring the distance of an aircraft from ground comprising two self-excited oscillating circuits arranged so as to produce a beat note, means for automatically varying the resonant frequency of one of said circuits in accordance with the distance of the aircraft from ground, means for maintaining the resonant frequency of the other circuit at a value independent of the distance of the aircraft from ground, said oscillating circuits being so tuned and coupled that the beat note disappears at a predetermined altitude at which the aviator performs an act in landing, and a telephone coupled with said oscillating circuits.

3. A device for measuring the distance of an aircraft from ground comprising two self-excited oscillating circuits arranged so as to produce a beat note, an electron tube and a grid circuit and plate circuit in each of said oscillating circuits and forming part thereof, a coil in each of said grid and plate circuits, respectively, the coils in the grid and plate circuit of each oscillating circuit being coupled with each other, said oscillating circuits being so tuned and coupled that the beat note disappears at a predetermined altitude at which the aviator performs an act in landing, means for automatically varying the resonant frequency of one of said circuits in accordance with the distance of the aircraft from ground, means for maintaining the resonant frequency of the other circuit at a value independent of the distance of the aircraft from ground, means for magnetically screening said circuits against each other, an untuned indicating circuit coupled with said oscillating circuits and a telephone forming part of said indicating circuit.

HUGO JUNKERS.
HEINRICH WIGGE.